US009469465B2

(12) United States Patent
Doerr et al.

(10) Patent No.: US 9,469,465 B2
(45) Date of Patent: Oct. 18, 2016

(54) METERING UNIT

(71) Applicant: Buerkert Werke GmbH, Ingelfingen (DE)

(72) Inventors: Andreas Doerr, Mulfingen (DE);
Martin Gille, Niedernhall (DE);
Andreas Grau, Erzhausen (DE);
Johann Gunnesch, Waldenburg (DE);
Christian Kleineberg, Pulheim (DE);
Harald Schaefer, Schoental (DE)

(73) Assignee: Buerkert Werke GmbH, Ingelfingen (DE)

( * ) Notice: Subject to any disclaimer, the term of this patent is extended or adjusted under 35 U.S.C. 154(b) by 269 days.

(21) Appl. No.: 13/957,171

(22) Filed: Aug. 1, 2013

(65) Prior Publication Data

US 2013/0313289 A1    Nov. 28, 2013

Related U.S. Application Data

(63) Continuation of application No. PCT/EP2012/000445, filed on Feb. 1, 2012.

(30) Foreign Application Priority Data

Feb. 1, 2011    (DE) .................... 20 2011 002 208 U

(51) Int. Cl.
*B67D 7/78*    (2010.01)
*B65D 83/54*   (2006.01)
(Continued)

(52) U.S. Cl.
CPC ............. *B65D 83/54* (2013.01); *G05D 7/0635* (2013.01); *B01F 5/04* (2013.01); *B01F 5/045* (2013.01);
(Continued)

(58) Field of Classification Search
CPC ......... B65D 83/00; B65D 83/54; B01F 5/04; B01F 5/045; B01F 5/0413; B67D 7/78; B67C 3/001; B67C 3/005; B67C 7/0073; B67C 7/008; B67C 7/0086; B05B 7/005; B05B 7/0416; B05B 7/2494; B05B 7/062
USPC .................. 222/129, 133, 145.5–145.6, 394, 222/399–401; 261/78.2, DIG. 75, 28, 50.3, 261/115–116; 137/101.2, 487, 888; 239/310–311, 336, 398, 407, 318
See application file for complete search history.

(56) References Cited

U.S. PATENT DOCUMENTS 2,890,765 A *  6/1959  Friedell ........................ 184/55.2
3,304,011 A *  2/1967  Paasche ....................... 239/305
(Continued)

FOREIGN PATENT DOCUMENTS

CN    1109164 A    9/1995
CN    2283243 Y    6/1998
(Continued)

OTHER PUBLICATIONS

International Preliminary Report on Patentability for application No. PCT/EP2012/000445 mailed on Aug. 15, 2013.
(Continued)

*Primary Examiner* — Paul R Durand
*Assistant Examiner* — Andrew P Bainbridge
(74) *Attorney, Agent, or Firm* — Hauptman Ham, LLP

(57) ABSTRACT

In a metering unit (10) having at least one outlet (20) for dispensing an aerosol with a defined concentration, with at least one inlet (180) for a carrier gas, at least one inlet for a liquid, preferably for a hydrogen peroxide solution, and a buffer container (30) for the liquid, it is provided that the metering unit (10) has at least one liquid flow controller (90) on the outflow side.

17 Claims, 4 Drawing Sheets

Figure 1:
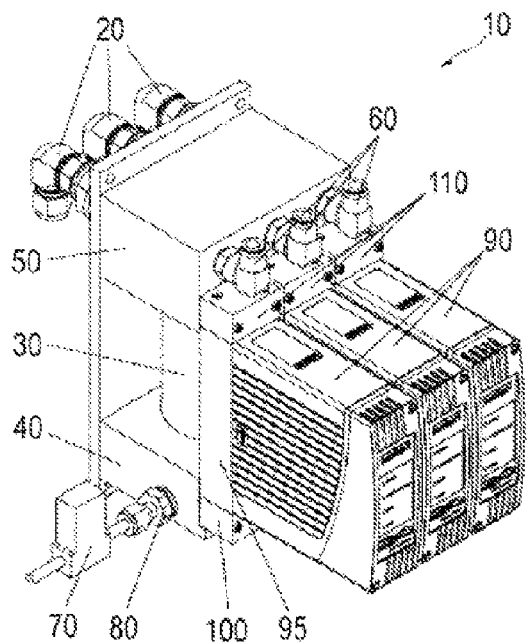

(51) Int. Cl.

| | |
|---|---|
| *G05D 7/06* | (2006.01) |
| *B67C 3/00* | (2006.01) |
| *B05B 7/24* | (2006.01) |
| *B67C 7/00* | (2006.01) |
| *B01F 5/04* | (2006.01) |
| *B05B 7/00* | (2006.01) |
| *B05B 7/06* | (2006.01) |
| *B05B 7/04* | (2006.01) |
| *B65B 31/00* | (2006.01) |
| *B65B 55/10* | (2006.01) |

(52) U.S. Cl.
CPC .............. *B01F 5/0413* (2013.01); *B05B 7/005* (2013.01); *B05B 7/0416* (2013.01); *B05B 7/062* (2013.01); *B05B 7/2494* (2013.01); *B65B 31/003* (2013.01); *B65B 55/10* (2013.01); *B67C 3/001* (2013.01); *B67C 3/005* (2013.01); *B67C 7/008* (2013.01); *B67C 7/0073* (2013.01); *B67C 7/0086* (2013.01); *B67D 7/78* (2013.01)

(56) References Cited

U.S. PATENT DOCUMENTS

| | | | | |
|---|---|---|---|---|
| 4,231,973 | A * | 11/1980 | Young ................... | A61M 11/06 128/200.11 |
| 5,248,448 | A * | 9/1993 | Waldron ................... | B05B 7/10 239/338 |
| 6,021,921 | A * | 2/2000 | Lan ...................... | B67D 7/0238 137/205 |
| 6,070,698 | A * | 6/2000 | Wells ...................... | F16N 7/32 184/55.2 |
| 6,805,307 | B2 * | 10/2004 | Dorendorf ............ | B05B 7/0416 239/318 |
| 6,899,114 | B2 * | 5/2005 | Wilson .................... | B01F 3/088 137/209 |
| 7,040,507 | B2 * | 5/2006 | Koike .................... | A61K 8/046 222/135 |
| 7,681,761 | B2 * | 3/2010 | Harra .......................... | 222/146.6 |
| 7,809,473 | B2 * | 10/2010 | Shajii et al. .................. | 700/282 |
| 2005/0084415 | A1 * | 4/2005 | McVey ................... | A61L 2/186 422/28 |
| 2009/0130268 | A1 * | 5/2009 | Euler ........................ | A61L 2/22 426/232 |
| 2009/0250532 | A1 * | 10/2009 | Ganan Calvo ........ | B05B 7/1686 239/137 |
| 2010/0018592 | A1 * | 1/2010 | Parker ........................ | 137/487.5 |
| 2010/0205907 | A1 * | 8/2010 | Herold .................... | A61L 2/208 53/426 |

FOREIGN PATENT DOCUMENTS

| | | |
|---|---|---|
| CN | 101389564 A | 3/2009 |
| DE | 102007039010 | 2/2009 |
| JP | 2002002626 | 1/2002 |

OTHER PUBLICATIONS

Written Opinion of the International Searching Authority for application No. PCT/EP2012/000445.
International Search Report mailed May 7, 2012 for PCT/EP2012/000445.
Chinese Office Action dated Apr. 22, 2015.

* cited by examiner

METERING UNIT

FIELD OF THE INVENTION

The invention relates to a metering unit for dispensing an aerosol that preferably contains a hydrogen peroxide solution as liquid component.

BACKGROUND

Aerosols are used in the food industry, for example for sterilising packaging.

In metering devices for dispensing an aerosol having a defined liquid concentration, flow measurements of the liquid are frequently carried out and the opening time of a switching valve is adjusted to the determined flow values.

Hydrogen peroxide solutions, which are usually used for sterilisation purposes with a concentration of 35%, tend to decompose at least partially into oxygen and water, especially at such high concentrations, so that apart from the liquid phase, a gaseous phase will always be present as well.

This gaseous component can have an adverse effect on the flow measurement of the liquid, so that the metering will subsequently become inaccurate and unreliable. However, it is especially in the food industry that very accurate metering processes are necessary, because it has to be avoided at all costs that either in the case of an overdosage food is contaminated with chemicals such as disinfectants or that in the case of an underdosage the packaging is not sterile and as a result, food will become infested with germs.

It is therefore the object of the invention to provide a metering unit that does not have these disadvantages and that allows an exact metering of an aerosol to be accomplished.

SUMMARY

The invention provides a metering unit having at least one outlet for dispensing an aerosol with a defined concentration, at least one inlet for a carrier gas, at least one inlet for a liquid, preferably a hydrogen peroxide solution, a buffer container for the liquid as well as at least one liquid flow controller on its outflow side. Liquid flow controllers have the advantage that they comprise a flow meter and a proportional valve in one unit, which means that the required valve is directly integrated in the liquid flow controller and therefore separate lines with pipes or tubes between the flow meter and the valve are eliminated. Different suitable flow metering units are known as components of a liquid flow controller, which are based on various measurements principles such as ultrasound, calorimetric, Coriolis, magnetically-inductive (MID), floating body or differential pressure, and which may be used in the invention. Moreover it is favourable if a proportional valve is integrated in the liquid flow controller. In the case of proportional valves, the opening degree of the valve can be open-loop controlled or even closed-loop controlled, which allows very fine adjustments to be made. As a result, the accuracy of the open-loop and/or closed-loop control and the metering is substantially increased.

In one embodiment, the at least one liquid flow controller has two absolute pressure measuring cells and operates according to the differential pressure method. This method can be used to determine very accurate flow measurements with particularly low tolerances.

The buffer container is e.g. mounted between a first and a second carrier module and each carrier module is preferably also fluidically and/or mechanically connected to at least one liquid flow controller. The carrier modules are formed to be substantially plate shaped. The first carrier module forms a bottom and the second carrier module a cover for the buffer container. By means of the carrier modules, the individual components of the metering unit are fluidically and/or mechanically connected to each other. To this end, the carrier modules include on a lateral surface fastening means for fastening the at least one liquid flow controller. Moreover, channels for fluidically connecting the components are arranged in the carrier modules. This allows a very compact and stable design of the metering unit to be achieved. In this way, the buffer container may be integrated in the metering unit in a compact and simple manner.

In one embodiment, a channel is provided in the first carrier module, which is formed as an inflow for the buffer container. Via this inflow, the buffer container can be filled with the liquid that is a component in the aerosol to be metered. Advantageously, liquid is continuously supplied to the buffer container and the buffer container is permanently kept under pressure. As a result, a continuous supply of the at least one liquid flow controller with liquid is ensured, whilst no significant amounts of gas can get to the liquid flow controller.

In the first carrier module, at least one fluid connection can be provided between the buffer container and an inlet of the at least one liquid flow controller. This design measure results in a fluid path as short as possible between the two components to be connected to each other and thus in a short dwell time of the liquid in connection lines of the metering unit. As a result, especially in the case of applications with hydrogen peroxide solutions, the interfering gas proportion is kept as low as possible as a result of the decomposition of hydrogen peroxide, as described above. Further, this measure also provides for a compact design.

In a further embodiment, a connection for a pressure relief valve for controlling the pressure in the buffer container is provided in the first carrier module. Thus, a desired maximum pressure in the buffer container will not be exceeded. However, the connection for the pressure relief valve may also be positioned directly on the buffer container.

The liquid exiting from the pressure relief valve can return to the buffer container. As a result, liquid consumption and thus costs can be reduced.

In an embodiment of the metering unit, all of the fluid connections are implemented in a piping-free manner, which means that no pipes or tubes are present as a fluid connection between the individual components. In an embodiment, each of an outlet and inlets of the metering unit has a piping-free shape. This has the advantage that the contact surfaces wetted with liquid within the metering unit are reduced and thus the liquid volume is kept as small as possible, which in the case of hydrogen peroxide solution again has a positive effect on the degree of decomposition and the gas proportion occurring during the metering process.

It is contemplated to connect an outlet of the at least one liquid flow controller with a mixing device for mixing the liquid with the carrier gas. The mixing device may also be connected directly to the outlet of the liquid flow controller in a piping-free manner.

All of the liquid-carrying connections from the inlet for liquid (in particular hydrogen peroxide) to the outlet of the aerosol can be free of piping. All channels are seated in units that are flanged together.

The mixing device has a feed line for the carrier gas for forming the aerosol. Thus, the aerosol in the mixing device is formed directly at the outlet of the liquid flow controller.

This, too, contributes towards keeping the dwell time of the liquid within the metering unit as short as possible.

In one embodiment, the mixing unit is provided on the second carrier module as well as the at least one outlet for dispensing the aerosol. Also as a result of this measure, all of the fluid connections are realised in a piping-free manner and the liquid volume within the metering unit is reduced. This has the advantage that the outlet on the second carrier module can be adapted to a desired connector, depending on the requirements of the further use of the aerosol. However, the outlet for dispensing the aerosol can also be provided directly on the mixing device.

In one embodiment, the at least one liquid flow controller is vertically provided in the metering unit. This has the advantage that the gas proportion that may be formed immediately flows in the direction of the outlet of the liquid flow controller and a gas bubble that would distort the flow measurement cannot develop at any other location in the metering unit.

In one embodiment, the buffer container has overflow means for adjusting the level of the hydrogen peroxide solution. Thus, a constant liquid level is ensured at all times during the metering process.

The overflow means can be formed as a riser pipe. This constitutes a cost-effective and simple solution for adjusting the level of the liquid in the buffer container.

A discharge of the overflow means is fluidically connected to the first carrier module and an outlet provided there. If the first carrier module forms the bottom for the buffer container, the overflow means can be connected directly at one end to the first carrier module in a simple manner, for example by inserting or screwing the overflow means into a recess provided for this purpose, which opens outwards into a channel in the first carrier module.

In one embodiment, a valve for the application of a defined pressure onto the buffer container is connected to the buffer container. This valve is above all important during the start-up phase of the metering unit, as long as the buffer container is filled with liquid. As a result of an initial pressure application by means of the valve, the at least one liquid flow controller is therefore supplied with liquid at an early stage, which means even before the desired liquid level has been reached, so that the metering unit will be ready for operation sooner.

In a further embodiment, a plurality of liquid flow controllers are mounted next to each other in a block-like manner on the first and/or second carrier module(s), the inlets of which are all fluidically connected to the buffer container and the outlets of which are respectively connected to a mixing device for dispensing aerosol. Thus, by means of one single metering unit, aerosol can be dispensed in parallel in a metered manner to a buffer container and a first and second carrier module on several outlets. As a result, a very compact and cost-effective metering unit is provided.

BRIEF DESCRIPTION OF THE DRAWINGS

FIG. 1 shows a three-dimensional representation of a metering unit according to the invention;

FIG. 2 shows an exploded view of the metering unit according to FIG. 1; and FIG. 3 shows a lateral view of the metering unit with a cross-sectional view in a sub-region;

FIG. 3*a* shows a detailed view of the flow meter of the metering unit according to FIG. 1;

FIG. 4 shows a three-dimensional representation of a second embodiment of a metering unit according to the invention;

FIG. 5 shows a top view of the metering unit according to FIG. 4;

FIG. 6 shows a cross-sectional view through the metering unit according to FIG. 4.

DETAILED DESCRIPTION

FIG. 1 shows a metering unit 10 having three outlets 20 for dispensing an aerosol. A common buffer container 30 for receiving a liquid, a component of the aerosol to be metered, is provided between a first, lower carrier module 40 and a second, upper carrier module 50.

The two carrier modules 40, 50 are substantially rectangular, one-piece parts that are formed so as to be parallel to each other.

A carrier gas is supplied via connectors 60 on the carrier module 50, to which the liquid for forming the aerosol is admixed (detailed description in FIG. 3).

The first carrier module 40 has a port 80 to which a pressure relief valve 70 for controlling the pressure in the buffer container 30 is connected.

Three liquid flow controllers 90, which are each formed as constructional units, respectively having a fluid block 95, are mechanically fixedly connected, for example by screwing, to one end 100 of the fluid block 95 with the first carrier module 40 and on the other end 110 with the second carrier module 50.

The liquid flow controllers 90 are disposed vertically within the metering unit 10 with respect to the liquid flow direction. Liquid flow controllers 90 usually comprise a fluid block 95, through which a main channel 96 extends, a flow sensor 97 and a proportional valve 98 (see FIG. 3). At the end 100 of the fluid block 95, a fluid inlet of the liquid flow controller 90 is provided, and at the end 110 a fluid outlet, which both open into the main channel 96 extending through said fluid block 95. Of course, other embodiments of the metering unit 10 may also be implemented, which have a different number of outlets 20 and liquid flow controllers 90, and it is also possible to provide more outlets 20 than liquid flow controllers 90 in the metering unit 10.

FIG. 2 shows an exploded view of the metering unit 10 having the three adjacent liquid flow controllers 90 corresponding to FIG. 1. The buffer container 30 is formed as a pipe section, axially open on both sides, between the first carrier module 40 as the bottom and the second carrier module 50 as the cover, and two sealing elements 120. The carrier modules 40, 50 have indentation bores which are adjusted to the outside diameter of the buffer container 30 and which receive the respective end of said buffer container 30.

The carrier modules 40, 50 have openings 130, 140 for fluid connections on lateral surfaces 45, 55. In the metering unit 10, each opening 130 in the carrier module 40 is fluidically connected to a fluid inlet at the end 100 of the liquid flow controller 90, and each opening 140 in the carrier module 50 is connected to a fluid outlet at the end 110 of the liquid flow controller 90.

The openings 130 provide fluid connections to the inside of the buffer container 30. They may be implemented as simple bores in the carrier module 40.

However, the buffer container 30 can also be formed as an integral unit with the carrier modules 40, 50 or as a container with a cover and a bottom that is adjacent to the carrier modules 40, 50, and may include fluid connections as separate ports.

A further opening 150 is provided in the carrier module 40, which is implemented as a simple bore through the carrier module 40 and leads into the buffer container 30. This opening 150 is used as a feed line for filling the buffer container 30 with a liquid that is a component of the aerosol to be metered.

By means of an overflow device 160 provided in the buffer container 30, the liquid level in the buffer container 30 is kept constantly at a desired level. The overflow device 160 is formed as a riser pipe and is fastened at the lower end thereof in the buffer container 30 parallel to the central axis thereof in the bottom, i.e. in the embodiment described here, in the carrier module 40 on a fluid outlet 165, for example screwed in by means of threaded connections.

A fluid connection leads from the fluid outlet 165 to an outlet 170 on a lateral surface of the carrier module 40. The port 80 is provided at the outlet 170 and is connected to the pressure relief valve 70. The riser pipe is formed to be open at the top and acts as an overflow pipe, into which the liquid flows when a certain level in the buffer container 30 is exceeded.

Advantageously, the overflow device 160 is arranged so as to be adjustable in its height in the buffer container 30, so that a desired level can be adjusted in the buffer container 30. The liquid exiting via the overflow device 160 can be returned into the buffer container 30.

The pressure relief valve 70 can be used to control the pressure in the buffer container 30. Of course it is insignificant for the functioning mode of the metering unit 10 on which lateral surface of the carrier module 40 the fluid connection is led out of the outlet 170. The port 80 may also be provided on a lateral surface other than the one shown in FIG. 2.

Apart from the openings 140 to connections with respectively one fluid outlet at the end 110 of a liquid flow controller 90, the carrier module 50 also includes inlets 180 to be coupled to the ports 60 for supplying the carrier gas.

The carrier modules 40, 50 are fixedly connected via a mounting plate 190. The mounting plate 190 increases the mechanical stability of the metering unit 10 and is useful for mounting the metering unit 10 in a system.

Since all of the fluid connections between the individual components are formed as channels within the carrier modules 40, 50 and the liquid flow controllers 90 are directly connected to the carrier modules 40, 50, other types of fluid lines such as tube or pipe connections may be dispensed with in the metering unit 10. The fluid connection paths are therefore implemented to be as short as possible. This piping-free design concerns in particular all the parts that carry liquid from the inlet of the liquid to the outlet 20 of the aerosol.

Figure 2:
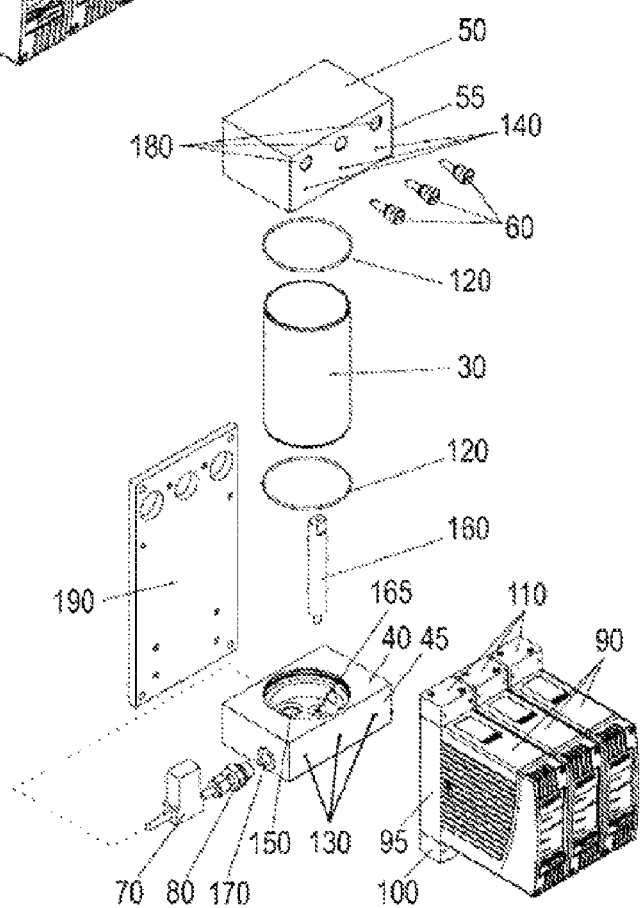
Figure 3:
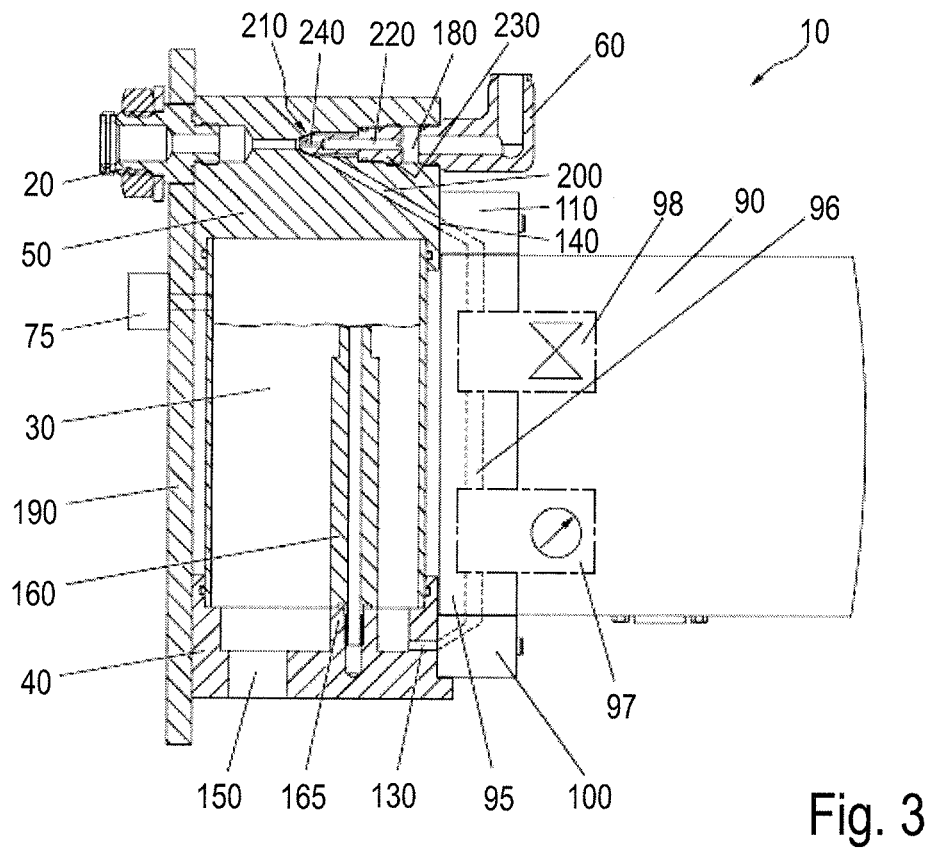

FIG. 3 shows a lateral view of the metering unit 10 with a cross-sectional view of all components with the exception of the liquid flow controller 90. Like FIG. 2, FIG. 3 shows the buffer container 30 with the overflow device 160, the carrier module 40 with the opening 150 for supplying the liquid into the buffer container and the mounting plate 190, plus additional details concerning the carrier module 50.

In the carrier module 50, the opening 140 is connected to a fluid outlet at the end 110 of the liquid flow controller 90. The opening 140 merges into a channel 200 in the carrier module 50, which leads to a mixing device 210 that is also provided in the carrier module 50. An exactly defined amount of liquid flows from the liquid flow controller 90 through the channel 200 into the mixing device 210. The mixing device 210 is provided in the carrier module 50 in a channel-shaped recess starting from the inlet 180 and has a channel 220 that is in communication with the port 60 for supplying the carrier gas via the inlet 180.

A removable insert 230 is inserted in the recess downstream of the inlet 180, which has the channel 220. The channel 200 opens into a mixing chamber 240 in the channel 220 of the insert 230, which mixing chamber narrows down in a nozzle-like manner. However, the use of an insert 230 is not absolutely necessary.

As a result of the merging channels 200, 220, the aerosol consisting of the liquid and the carrier gas is provided at the end of the mixing device 210. To ensure that also a defined amount of carrier gas gets into the mixing device 210, a gas flow controller, for example a mass flow controller, can be connected to the port 60.

The end of the mixing device 210 is fluidically connected to the outlet 20 of the metering unit 10. This outlet 20 is adapted to a desired port, depending on the further use of the metered aerosol.

Further, a valve 75 is connected to the buffer container 30, which is only schematically shown in FIG. 3, through which valve a defined pressure can be applied onto the buffer container 30.

The functioning mode of the metering unit 10 will be briefly summarised again below. For forming an aerosol, a liquid is fed via an opening 150 forming an inlet of the metering unit 10 and a carrier gas is fed via the ports 60. The opening 150 forms a channel that is used as an inflow for the buffer container 30. The liquid initially fills the buffer container 30. The liquid flows from the buffer container 30 via the carrier module 40 to the openings 130. Each opening 130 is connected to a fluid inlet at the end 100 of the fluid block 95 of a liquid flow controller 90, so that the liquid gets into the main flow channel 96.

Each main flow channel 96 has connected thereto respectively one flow sensor 97, which measures the flow of liquid therethrough. The opening degree of the proportional valve 98 is adjusted accordingly, and a defined amount of liquid reaches the outlet at the end 110 of the fluid block 95 of the liquid flow controller 90.

Figure 3A:
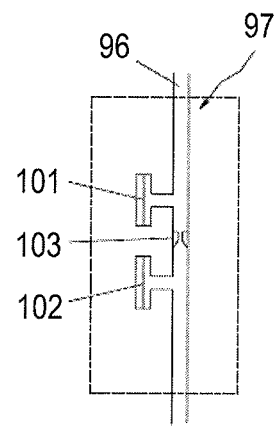

FIG. 3a shows a schematic view of the design of a flow sensor 97. The flow sensor 97 operates according to the differential pressure method. To this end, the flow sensor 97 has two absolute pressure measuring cells 101, 102 as well as an aperture 103 for pressure reduction, which is provided in the main flow channel 96 between the absolute pressure measurement cells 101, 102. The flow rate of liquid flowing through the main flow channel 96 can be determined from the difference between the pressures measured by the two absolute pressure measuring cells 101, 102 as well as from further (known) parameters such as for example the liquid density.

The fluid outlet of the liquid flow controller 90 is immediately next to the opening 140, so that the liquid flows from the liquid flow controller 90 to the opening 140 in the carrier module 50 and there into the channel 200.

The liquid flows through the channel 200 further into the mixing chamber 240 of the mixing device 210. Also the carrier gas flows into the mixing chamber 240 via the port 60, the inlet 180 in the carrier module 50 and the channel 220 of the mixing device 210, as a result of which the aerosol to be metered is produced in the mixing chamber 240.

That means that in the embodiment shown in FIGS. 1 to 3, the carrier gas flows through the mixing device 210 in the longitudinal direction completely through the channel 220. The aerosol flows from the outlet of the mixing chamber 240 to the outlet 20 of the metering unit 10.

Figure 4:
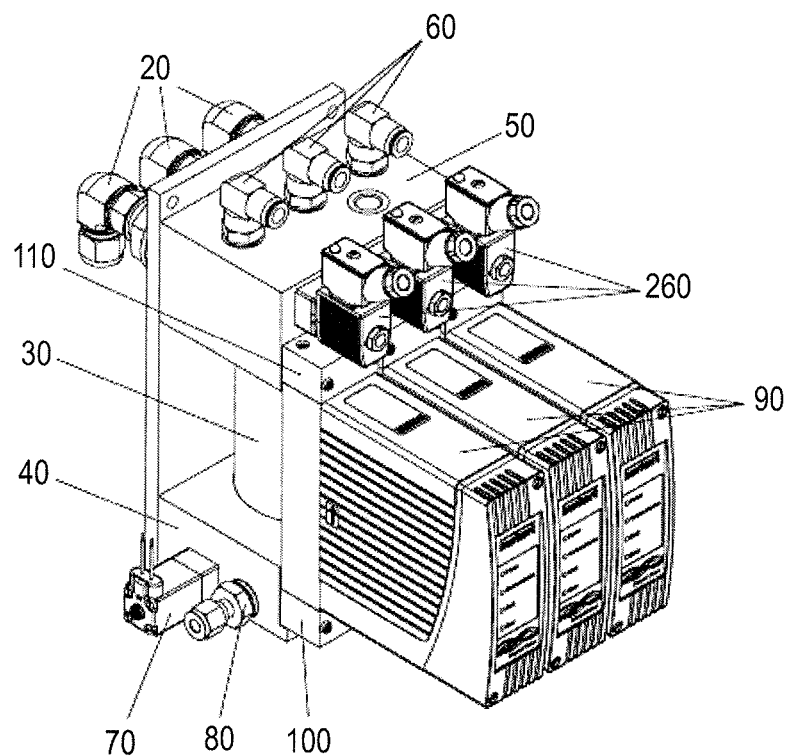
Figure 5:
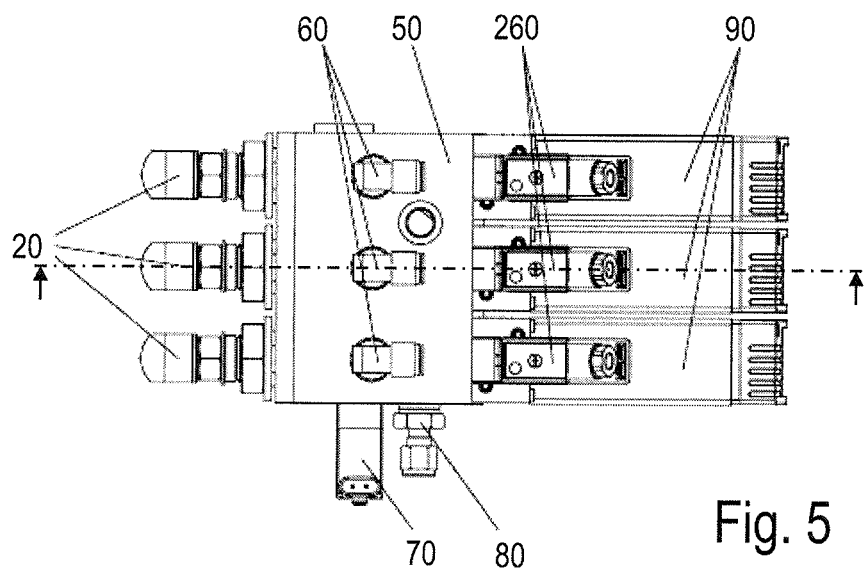
Figure 6:
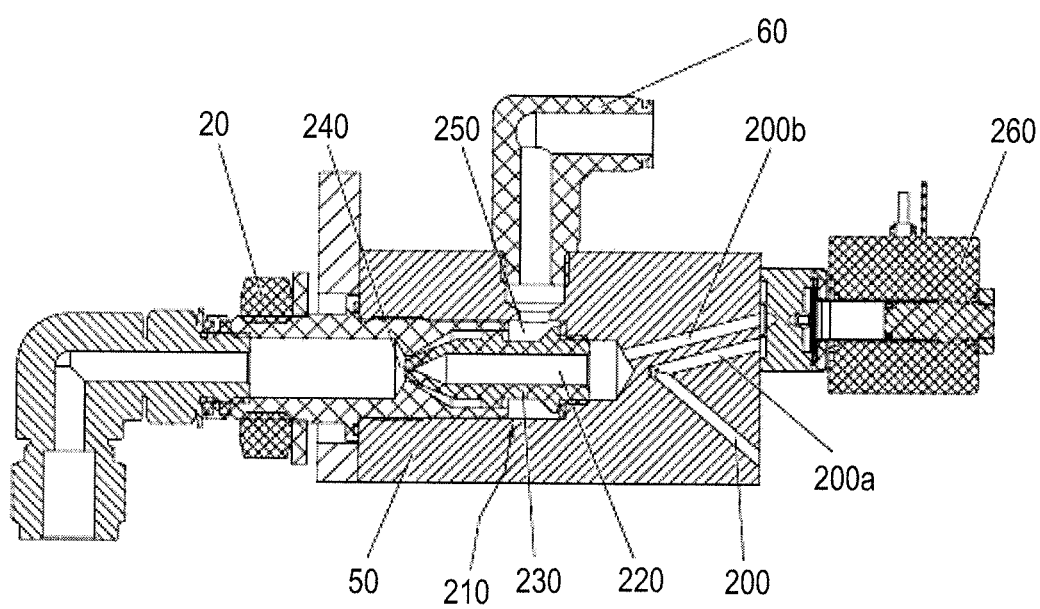

The embodiment shown in FIGS. 4 to 6 differs from the embodiment shown in FIGS. 1 to 3 in that the channel 200, in which the liquid flows into the mixing device 210, opens into the channel 220. An annular channel 250 is provided on the mixing device 210, into which the carrier gas is passed via the inlet 180 for the carrier gas to the mixing chamber 240.

Also the mixing device 210 shown in FIGS. 1 to 3 may include such an annular channel.

Moreover, the channel 200 has two sections 200a, 200b, between which an additional valve 260 is provided, which is used as a shut-off valve.

The port 60 or the inlet 180 for the carrier gas are here provided on the top surface of the carrier module 50.

The shut-off valve ensures for example that the supply of the liquid into the mixing device 210 can, if needed, be reliably stopped.

Thus, the additional valve 260 can be regarded as a safety device.

In FIGS. 4 and 5, the pressure relief valve 70 is connected via internal channels in the carrier module 40 to the overflow device 160 as well as the port 80. The liquid exiting from the metering unit 10 via the flow device 160 is discharged via the port 80.

The invention claimed is:

1. A metering unit having at least one outlet for dispensing an aerosol with a defined concentration, having at least one inlet for a carrier gas, at least one inlet for a liquid, and a buffer container for the liquid, wherein the metering unit has at least one liquid flow controller on the metering unit's outflow side,
   wherein the buffer container has overflow means for adjusting the level of the liquid, and
   wherein the overflow means is formed as a riser pipe.

2. A metering unit having at least one outlet for dispensing an aerosol with a defined concentration, having at least one inlet for a carrier gas, at least one inlet for a liquid, and a buffer container for the liquid, wherein the metering unit has at least one liquid flow controller on the metering unit's outflow side,
   wherein
   the buffer container is mounted between a first carrier module and a second carrier module,
   a plurality of liquid flow controllers is mounted next to each other in a block-like manner on at least one of the first and second carrier modules, and
   the inlets of the liquid flow controllers are all fluidically connected to the buffer container and the outlets of the liquid flow controllers are respectively connected to a mixing device for dispensing aerosol.

3. A metering unit, comprising:
   at least one outlet configured to dispense an aerosol with a defined concentration;
   at least one first inlet configured to receive a carrier gas;
   at least one second inlet configured to receive a liquid;
   a buffer container configured to buffer the liquid, wherein the buffer container is mounted between a first carrier module and a second carrier module;
   at least one liquid flow controller disposed on an outflow side of the metering unit; and
   a channel disposed in the first carrier module, wherein the channel is disposed as an inflow for the buffer container,
   wherein each of the outlet, the first inlet, and the second inlet has a piping-free shape.

4. The metering unit according to claim 3, wherein the at least one liquid flow controller comprises two absolute pressure measuring cells configured to operate according to a differential pressure method.

5. The metering unit according to claim 3, wherein each of the first and second carrier modules is at least one of fluidically and mechanically connected to the at least one liquid flow controller.

6. The metering unit according to claim 3, further comprising:
   at least one fluid connection disposed between the buffer container and an inlet of the at least one liquid flow controller in the first carrier module.

7. The metering unit according to claim 3, further comprising:
   a port for a pressure relief valve disposed in the first carrier module, the pressure relief valve configured to control a pressure in the buffer container.

8. The metering unit according to claim 7, wherein the liquid exits at the pressure relief valve and then returns into the buffer container.

9. The metering unit according to claim 3, wherein an outlet of the at least one liquid flow controller is connected to a mixing device configured to mix the liquid with the carrier gas.

10. The metering unit according to claim 9, wherein the mixing device comprises a feed line configured to feed the carrier gas for forming the aerosol.

11. The metering unit according to claim 9,
    wherein the mixing device is disposed on or in the second carrier module, and
    wherein the second carrier module comprises the at least one outlet configured to dispense the aerosol.

12. The metering unit according to claim 3, wherein the at least one liquid flow controller is vertically arranged in the metering unit.

13. The metering unit according to claim 3, wherein the buffer container comprises an overflow element configured to adjust a level of the liquid.

14. The metering unit according to claim 13, wherein the overflow element comprises a riser pipe.

15. The metering unit according to claim 13,
    wherein a discharge of the overflow element is fluidically connected to the first carrier module and an outlet provided at the first carrier module.

16. The metering unit according to claim 3, further comprising:
    a valve connected to the buffer container and configured to apply a specific amount of pressure to the buffer container.

17. The metering unit according to claim 3,
    wherein a plurality of liquid flow controllers is mounted next to each other in a block-like manner on at least one of the first and second carrier modules,
    wherein inlets of the liquid flow controllers are all fluidically connected to the buffer container, and outlets of the liquid flow controllers are respectively connected to a mixing device for dispensing aerosol.

* * * * *